United States Patent
Park et al.

(10) Patent No.: US 7,646,749 B2
(45) Date of Patent: Jan. 12, 2010

(54) DOWNLINK BEAMFORMING APPARATUS IN OFDMA SYSTEM AND TRANSMISSION APPARATUS INCLUDING THE SAME

(75) Inventors: Hyeong-Sook Park, Daejeon (KR); Kyung-Yeol Sohn, Daejeon (KR); Dae-Ho Kim, Daejeon (KR); Jun-Woo Kim, Daejeon (KR); Youn-Ok Park, Daejeon (KR)

(73) Assignees: Samsung Electronics Co., Ltd. (KR); Electronics & Telecommunications Research Institute (KR); KT Corporation (JP); SK Telecom Co., Ltd. (KR); Hanaro Telecom., Inc. (KR)

( * ) Notice: Subject to any disclaimer, the term of this patent is extended or adjusted under 35 U.S.C. 154(b) by 449 days.

(21) Appl. No.: 11/636,812

(22) Filed: Dec. 11, 2006

(65) Prior Publication Data

US 2007/0135052 A1 Jun. 14, 2007

(30) Foreign Application Priority Data

Dec. 10, 2005 (KR) .................. 10-2005-0121332

(51) Int. Cl.
*H04Q 7/00* (2006.01)
(52) U.S. Cl. ............... 370/334; 370/342; 370/344; 455/562.1
(58) Field of Classification Search ......... 370/328–330, 370/334, 342, 344; 455/561, 562.1
See application file for complete search history.

(56) References Cited

U.S. PATENT DOCUMENTS

| 7,194,237 | B2* | 3/2007 | Sugar et al. ............... 455/39 |
| 7,423,961 | B2* | 9/2008 | Ogawa et al. ............. 370/210 |
| 7,545,778 | B2* | 6/2009 | Sugar et al. .............. 370/335 |
| 2005/0070331 | A1* | 3/2005 | Higuchi et al. .......... 455/562.1 |
| 2005/0078763 | A1 | 4/2005 | Choi et al. |
| 2008/0108310 | A1* | 5/2008 | Tong et al. ............... 455/69 |
| 2009/0067513 | A1* | 3/2009 | Kim et al. ................ 375/260 |

FOREIGN PATENT DOCUMENTS

| KR | 1020030068783 | 8/2003 |
| KR | 1020050067336 | 7/2005 |

OTHER PUBLICATIONS

Figueiredo et al., Transmit Diversity Vs Beamforming for Multi-User OFDM System, Aug. 24, 2007.

* cited by examiner

*Primary Examiner*—Nhan T Le
(74) *Attorney, Agent, or Firm*—The Farrell Law Firm, LLP

(57) ABSTRACT

A downlink beamforming apparatus and a transmission apparatus including the same includes a subcarrier based user identifier for dividing subcarriers according to users, a beamforming weight buffer for storing first beamforming weights for the subcarriers by each of transmitting antennas, an interpolator for outputting second beamforming weights for each transmitting antenna by interpolating the first beamforming weights, and a signal reproducer for reproducing the signal for each transmitting antenna. Subcarriers are allocated to the signal by each user; and a complex multiplier multiplies the signal for each transmitting antenna by the second beamforming weights.

9 Claims, 4 Drawing Sheets

FIG.3

Memory for CS Channel Estimation Value $w_0^0$ — Antenna Number / Carrier Index

| | | | |
|---|---|---|---|
| $0(w_0^0)$ | $864(w_0^1)$ | $1728(w_0^2)$ | $2592(w_0^3)$ |
| $1(w_1^0)$ | $865(w_1^1)$ | $1729(w_1^2)$ | $2593(w_1^3)$ |
| $2(w_2^0)$ | $866(w_2^1)$ | $1730(w_2^2)$ | $2594(w_2^3)$ |
| | | | |
| $861(w_{861}^0)$ | $1725(w_{861}^1)$ | $2589(w_{861}^2)$ | $3453(w_{861}^3)$ |
| $862(w_{862}^0)$ | $1726(w_{862}^1)$ | $2590(w_{862}^2)$ | $3454(w_{862}^3)$ |
| $863(w_{863}^0)$ | $1727(w_{863}^1)$ | $2591(w_{862}^2)$ | $3455(w_{863}^3)$ |

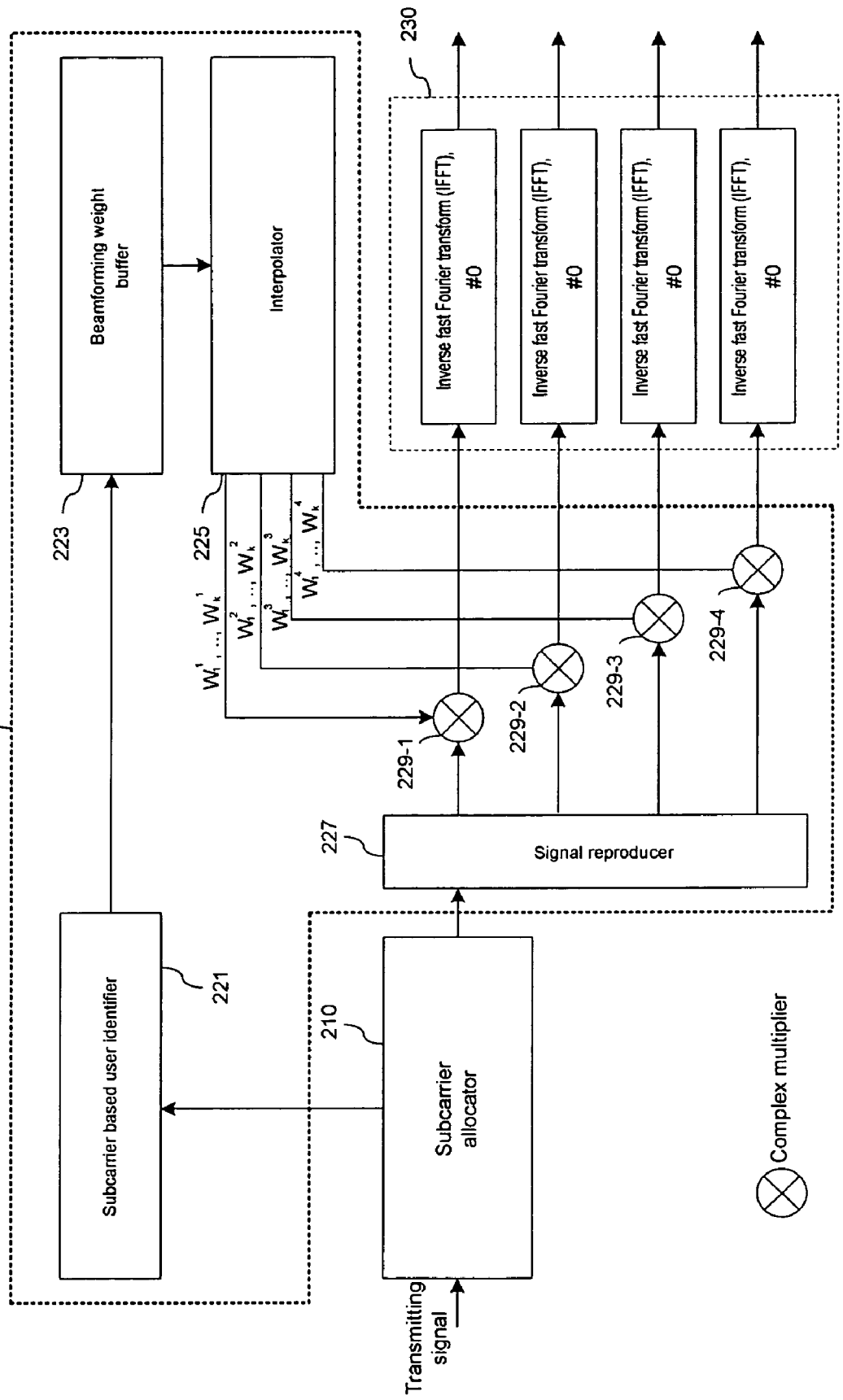

DOWNLINK BEAMFORMING APPARATUS IN OFDMA SYSTEM AND TRANSMISSION APPARATUS INCLUDING THE SAME

PRIORITY

This application claims priority to Korean Patent Application No. 10-2005-0121332 filed in the Korean Intellectual Property Office on Dec. 10, 2005, the contents of which are incorporated herein by reference.

BACKGROUND OF THE INVENTION

1. Field of the Invention

The present invention relates generally to an Orthogonal Frequency Division Multiplex Access (OFDMA) system, and more particularly, to a downlink beamforming apparatus and a transmission apparatus including the same.

2. Description of the Related Art

An OFDMA system needs to adopt transmission techniques for beamforming and diversity using multiple antennas in order to improve performance and capacity of the OFDMA system.

Beamforming and diversity are defined in the wireless access standard, such as IEEE 802.16e Wireless Local Area Network (WLAN) OFDMA PHY, in order to extend cell coverage by improving a link budget of the OFDMA system because the Adaptive Array System (AAS) technique is applied to a system including one terminal antenna.

An uplink channel sounding signal is defined in a transmitting apparatus of an OFDMA/Time Division Duplex (TDD) system applying beamforming transmission in order for a base station to measure and convert measured uplink channel information into prospective downlink channel reaction. In addition, a terminal periodically transmits a sounding signal in order to support prediction of a downlink channel under a mobile environment.

A base station can measure uplink channel information by using uplink channel sounding information and reciprocity of a TDD system, and obtain a weigh value for downlink beamforming by using the uplink channel information so as to form a downlink beam pattern. An apparatus for transmitting beamforming applied to an OFDM TDMA system in IEEE 802.11a is described in US Patent Publication No. 2005/0078763, entitled "Apparatus and Method of Multiple Antenna Transmitter Beamforming of High Data Rate Wideband Packetized Wireless Communication Signals".

Although many users of the OFDMA system simultaneously share subcarriers used for the OFDMA system, uplink/downlink users for the same frame may not always be scheduled identically. Accordingly, uplink channel information needs to be detected by each user and each antenna, and then stored at a buffer in order to be applied to a downlink transmit frame that is consecutive to the uplink channel information. When the uplink channel information is directly applied to a downlink, a weight value may be selectively multiplied by each user because a downlink transmitter allocates subcarriers by each user according to the OFDMA system. However, when an uplink frame receives information for $N_u$ users, a beamforming weight value needs to be stored at a buffer of which a size is as much as $N_u \times K \times N_a \times 2 \times N_{used}$ in order for the information received by the uplink frame to be applied to the downlink frame consecutive to the uplink frame. $N_a$ denotes the number of antennas of the base station, 2 denotes I/Q (In phase/Quadrature phase) channel, $N_{used}$ denotes the number of subcarriers used for one symbol of OFDM system, and K denotes word length representing channel information.

However, since K is generally a large amount, hardware complexity of a beamforming apparatus undesirably tends to increase.

SUMMARY OF THE INVENTION

The present invention has been made to provide a downlink beamforming apparatus in an OFDMA system and a transmission apparatus including the same, for reducing power consumption by minimizing hardware complexity and providing an efficient structure of the downlink beamforming apparatus.

A downlink beamforming apparatus of an OFDMA system according to one exemplary embodiment of the present invention includes a subcarrier based user identifier for dividing subcarriers according to users, a beamforming weight buffer for storing first beamforming weights for subcarriers by each transmitting antenna, an interpolator for outputting second beamforming weights for each transmitting antenna by interpolating the first beamforming weights outputted by the beamforming weight buffer, a signal reproducer for copying the signal at least once to reproduce the signal for each transmitting antenna, wherein subcarriers are allocated to the signal by each user, and a complex multiplier for multiplying the signal for each transmitting antenna outputted from the signal reproducer and the second beamforming weights for each transmitting antenna outputted from the interpolator.

A downlink transmitting apparatus of an OFDMA system according to another exemplary embodiment of the present invention includes a subcarrier allocator for allocating subcarriers to a transmitting signal by each user, a downlink beamforming apparatus for storing first beamforming weights of subcarriers by each transmitting antenna, and copying the transmitting signal at least once to reproduce the transmitting signal for each transmitting antenna, identifying users of the subcarriers allocated by the subcarrier allocator, and obtaining second beamforming weights for the subcarriers allocated to each user from the first beamforming weights corresponding to the identified users, and multiplying the second beamforming weights and the transmitting signal for each transmitting antenna, and an Inverse Fast Fourier Transform (IFFT) unit for performing an IFFT for the transmitting signal for each transmitting antenna outputted from the downlink beamforming apparatus.

According to yet another exemplary embodiment of the present invention, provided is a downlink beamforming method including allocating subcarriers to a first transmitting signal by each user, storing first beamforming weights for subcarriers by each of transmitting antennas, identifying users to which the subcarriers are allocated, obtaining second beamforming weights for the allocated subcarriers from the first beamforming weights corresponding to the identified users, and multiplying the second beamforming weights and second transmitting signals for the transmitting antennas.

BRIEF DESCRIPTION OF THE DRAWINGS

The above and other objects, features and advantages of the present invention will become more apparent from the following detailed description when taken in conjunction with the accompanying drawings in which:

FIG. 3 illustrates a structure of a beamforming weight buffer used for a downlink beamforming apparatus of an OFDMA system according to an exemplary embodiment of the present invention; and FIG. 4 illustrates a transmitting apparatus of an OFDMA system according to an exemplary embodiment of the present invention.

DETAILED DESCRIPTION OF THE PREFERRED EMBODIMENTS

Figure 1:
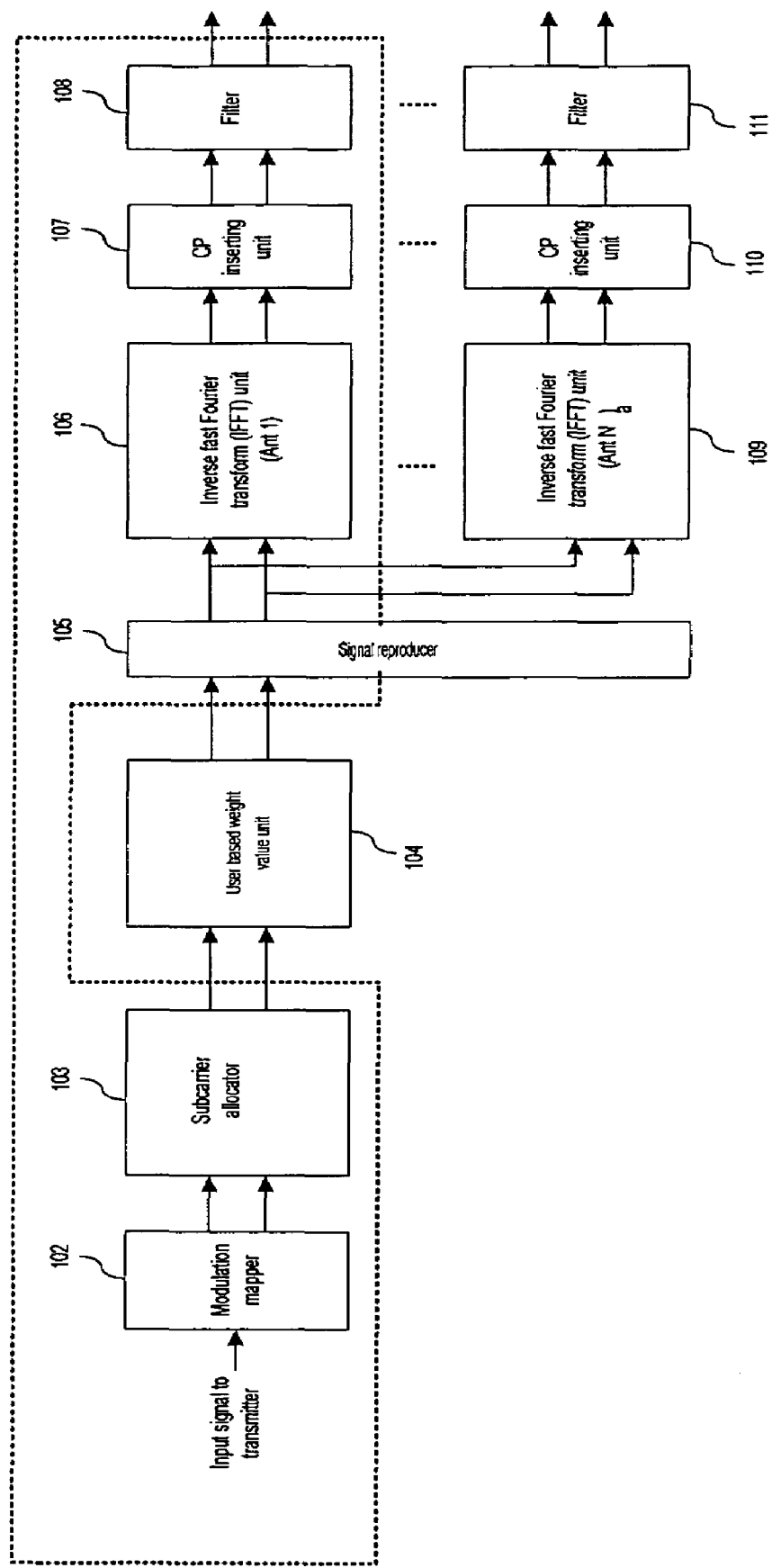
FIG. 1 illustrates a transmitting apparatus of a conventional OFDMA system, to which the present invention is applied.

Preferred embodiments of the present invention will hereinafter be described in detail with reference to the accompanying drawings. Like reference numerals designate like elements throughout the specification. In the following description, well-known functions or constructions are not described in detail for the sake of clarity and conciseness.

A downlink beamforming apparatus according to the present invention forms a beam pattern by using antenna array in order to supply subscribers with appropriate signal quality in an OFDMA system.

FIG. 1 illustrates a transmitting apparatus of a conventional OFDMA system, to which the present invention is applied.

As shown in FIG. 1, a conventional transmitting apparatus (within the dotted lines in FIG. 1) includes a modulation mapper 102, subcarrier allocator 103, signal reproducer 105, IFFT unit 106, Cyclic Prefix (CP) inserting unit 107 and filter 108.

An input signal to the transmitting apparatus inputs into the modulation mapper 102 by a burst unit for data arrangement by an OFDMA symbol unit, and is mapped according to a modulation scheme, such as Quadrature Phase Shift Key (QPSK), 16 Quadrature Amplitude Modulation (QAM) and 64 QAM. The subcarrier allocator 103 allocates subcarrier by each user to such mapped signal according to a subcarrier allocation algorithm. Subsequently, the IFFT unit 106 performs IFFT for the mapped signal by an OFDM symbol unit, and CP is added to the signal while passing the CP inserting unit 107. The signal filtered in the filter 108 is transmitted as a downlink transmitting signal.

A downlink beamforming apparatus forms transmitting beam by using a beamforming weight value of each antenna, wherein the beamforming weight value is obtained by using downlink channel information already known to a base station. A Time-Division-Duplex (TDD) system obtains the beamforming weight value when uplink channel information from a base station is used as a downlink channel estimate by applying channel reciprocity.

In addition, a downlink beamforming apparatus may form a beam pattern by multiplying the weight value for each user in a front or rear terminal of the IFFT unit. When it is assumed that the uplink channel information estimated at a frequency domain may supply the downlink beamforming apparatus, the weight value for each user is multiplied in the front terminal of the IFFT unit 106.

The downlink beamforming apparatus according to an exemplary embodiment of the present invention additionally includes the user base weight value unit 104 and signal reproducer 105 before the IFFT unit 106 so as to multiply the weight value for each user by each antenna. Subsequently, the signal reproducer 105 copies signals as many as the number of the antennas ($N_a$) so as to be applied as input signals of the IFFT units 106 and 109. Consequently, the signal combining all the $N_a$ transmitting signals is applied as the receiving signal of the terminal.

Figure 2:
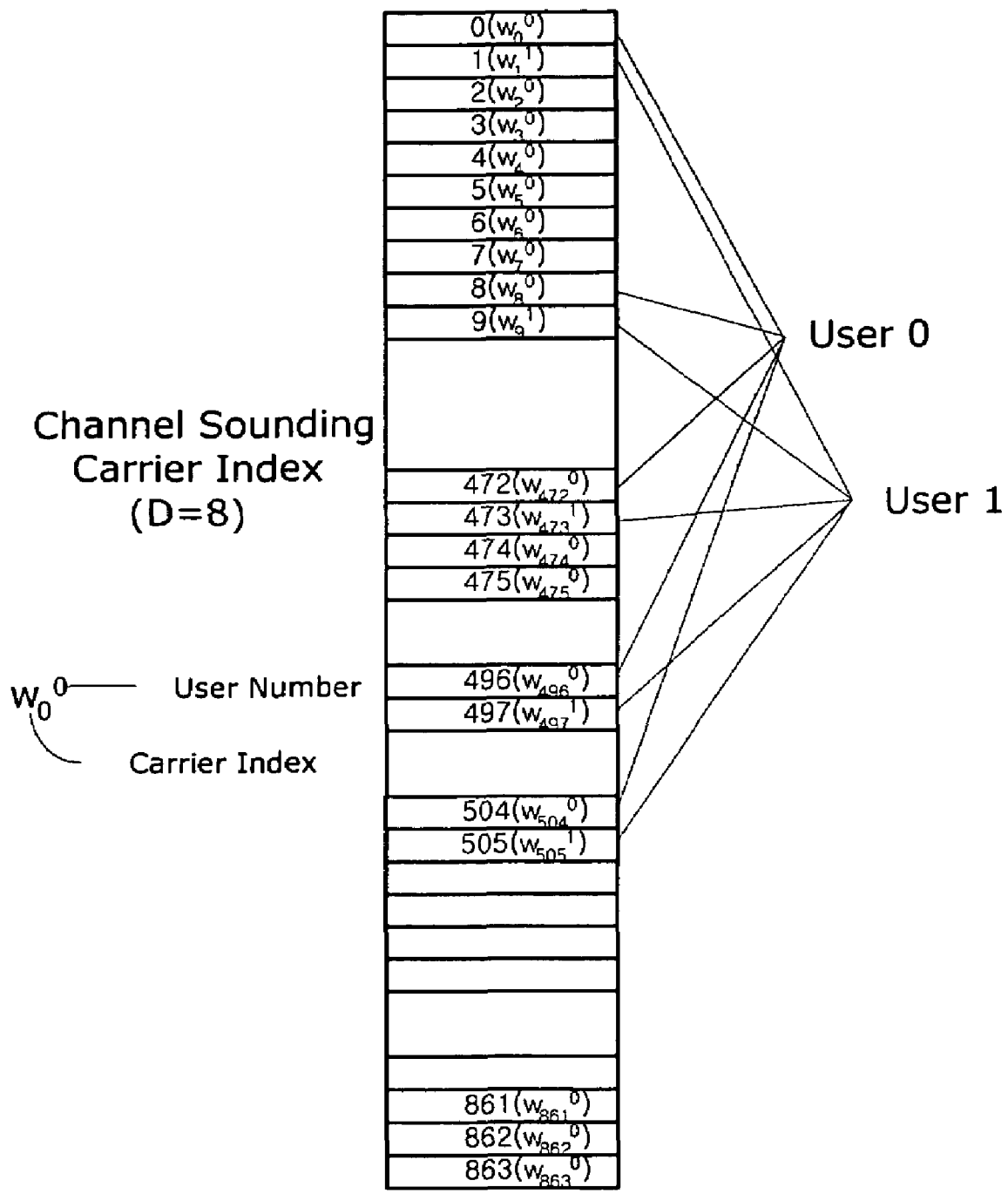
FIG. 2 illustrates a subcarrier structure of a channel sounding in order to obtain uplink channel information in a conventional OFDMA transmitting apparatus.

FIG. 2 illustrates a subcarrier structure of a channel sounding in order to obtain uplink channel information in a conventional OFDMA transmitting apparatus.

As shown in FIG. 2, a downlink Optimal BeamForming (OBF) scheme may obtain performance gain by maximizing instantaneous receiving Signal-to-Noise Ratio (SNR) by using four base station antennas of the system that also includes one terminal antenna.

The base station obtains uplink channel information by each user by using channel sounding information that is regularly transmitted at the terminal. The channel sounding signal uses 864 subcarriers that are dividedly used by each user. When the maximum number of users that are simultaneously received on the uplink is $N_u$, the users may transmit a channel sounding subcarrier and the base station may estimate the channel by using the channel sounding subcarrier. In addition, the beamforming weight value by each user is necessary for applying the beamforming weight value to users transmitted to the downlink. Accordingly, when the uplink channel information is obtained, the channel information regarding all subcarriers by each user needs to be stored at a buffer.

FIG. 3 illustrates a beamforming weight buffer in an OFDMA system according to an exemplary embodiment of the present invention.

Generally, a downlink beamforming apparatus requires a buffer storing the beamforming weight value by each antenna and each subcarrier, wherein the size of the buffer needs to be several times of $N_u$ that is the maximum number of users that are simultaneously received on the uplink. In addition, when it is assumed that the beamforming weight value is K bit, the size of the buffer needs to be as set forth by the following Equation (1).

$$K \times N_u \times N_a \times 2 \times N_{used} \quad (1)$$

In Equation (1), $N_a$ denotes 4, $N_{used}$ denotes 864, and "2" denotes an I/Q channel.

In addition, the buffer size N of the IFFT may be 1024, and K may be 14. Since the size of the buffer used in the downlink beamforming apparatus can be increased due to a large value for K, hardware complexity of a beamforming apparatus can also be increased.

Therefore, as shown in FIG. 3, a downlink beamforming apparatus according to the exemplary embodiment of the present invention obtains channel information on the uplink by each antenna, and the buffer stores channel information that is obtained by each subcarrier rather than by each user. In addition, when the beamforming weight value is multiplied in transmitting downlink beam, the weight value by each user is used therein. Consequently, the size of the buffer for storing data can be reduced as set forth by the following Equation (2).

$$K \times N_a \times 2 \times N_{used} \quad (2)$$

Comparing Equation 2 with Equation 1, the size of the buffer is reduced as much as $N_u$ times.

FIG. 4 illustrates a transmitting apparatus including a downlink beamforming apparatus according to an exemplary embodiment of the present invention, wherein the beamforming weight buffer has the size as set forth by Equation 2.

Generally, channel information regarding an unused subcarrier among subcarriers of the corresponding user can be obtained by an interpolation method by using two adjacent subcarriers included in the corresponding user in order to obtain channel information by each user in the uplink receiver. Accordingly, processes performed in an uplink receiver of the downlink beamforming apparatus according to the exemplary embodiment of the present invention are performed in a downlink transmitter thereof.

As shown in FIG. 4, the transmitting apparatus in the OFDMA system according to the exemplary embodiment of the present invention includes a subcarrier allocator 210, a downlink beamforming apparatus 220 and an IFFT unit 230.

The subcarrier allocator 210 allocates subcarriers by each user to transmitting signals.

The downlink beamforming apparatus 220 copies signals outputted from the subcarrier allocator 210 as many times as the number of the antenna, and then it outputs the copied signals. The downlink beamforming apparatus 220 includes a buffer for storing the beamforming weight value by each antenna and subcarrier, wherein the beamforming weight value is obtained from uplink channel information. In addition, the downlink beamforming apparatus 220 divides users of subcarriers allocated by the subcarrier allocator 210, and obtains the beamforming weight value of the subcarriers by referring to the beamforming weight value stored at the buffer corresponding to the divided users, and outputs the copied signals multiplied by the calculated beamforming weight value.

The IFFT unit 230 receives signals as many as the number of the antennas outputted from the downlink beamforming apparatus 220, and outputs the signals by performing an IFFT on each signal in serial sequence.

The downlink beamforming apparatus 220 includes a subcarrier based user identifier 221, a beamforming weight buffer 223, an interpolator 225, a signal reproducer 227 and complex multipliers 229-1, 229-2, 229-3 and 229-4.

When subcarrier allocator 210 allocates subcarriers to the downlink corresponding to a target section of an adaptive array system, the subcarrier based user identifier 221 receives information for subcarriers differently allocated by each user, stores the information in dividing users by each subcarrier, and outputs the information.

As shown in FIG. 3, the beamforming weight buffer 223 obtains channel information by each antenna on the uplink, and stores the beamforming weight value by each antenna and subcarrier after obtaining the beamforming weight value by each subcarrier rather than by each user, and outputs the beamforming weight value corresponding to two subcarriers that are adjacent to the subcarrier of the user outputted from the subcarrier based user identifier 221.

The interpolator 225 performs an interpolation method for two beamforming weight values outputted from the beamforming weight buffer 223, and then outputs the beamforming weight value by each antenna.

The signal reproducer 227 copies signals outputted from the subcarrier allocator 210 as many times as the number of the antennas, and then outputs the copied signals. Specifically, since four transmitting antennas are used according to the exemplary embodiment of the present invention, four copied signals are outputted by the signal reproducer 227.

The complex multipliers 229-1, 229-2, 229-3 and 229-4 multiply four signals outputted from the signal reproducer 227 by the beamforming weight values outputted from the interpolator 225, and then output the multiplication results to the IFFT unit 230.

When the weight value by each user is obtained before allocating the subcarrier, the subcarrier based user identifier 221 is not necessary in the transmitting apparatus. However, the transmitting apparatus without the subcarrier based user identifier may have a drawback in that the buffer required for allocating the subcarrier is necessary for each antenna.

Accordingly, the subcarrier based user identifier 221 stores information regarding the users corresponding to the subcarriers by each user allocated to the corresponding frame, and the subcarrier based user identifier 221 reads the users corresponding to the order of the subcarriers, and an input end of the IFFT unit 230 determines the location for the subcarrier of the channel sounding regarding the users. Information about how the channel sounding subcarrier is allocated by each user can be known by control information received from the upper layer.

Subsequently, the beamforming weight buffer 223 reads the beamforming weight values corresponding to two subcarriers that are most adjacent to the subcarrier of which the beamforming weight value needs to be determined by the input end of the IFFT unit 230, and the interpolator 225 performs the interpolation by using those two beamforming weight values. Such processes in the beamforming weight buffer 223 and the interpolator 225 are performed during one sample period for the input subcarrier of the IFFT unit 230, and the beamforming weight value obtained in delaying one sample period and the output of the signal reproducer 227 are multiplied in each sample period.

Two carriers are necessary for the interpolation in order to perform the first interpolation between the beamforming weight values. The first Gaussian interpolation is performed according to the exemplary embodiment of the present invention.

In addition, the IFFT unit 230 according to the exemplary embodiment of the present invention processes data in serial sequence. Particularly, the IFFT unit 230 processes results that are multiplied by the beamforming weight value by each antenna through the complex multipliers 229-1, 229-2, 229-3 and 229-4. Since the transmitting apparatus according to the exemplary embodiment of the present invention has four antennas, the transmitting apparatus can be designed by using only four complex multipliers 229-1, 229-2, 229-3 and 229-4 regardless of whether the size of the IFFT unit 230 is increased.

According to the exemplary embodiment of the present invention, the size of the buffer can be reduced because the beamforming weight value is obtained in the uplink by each antenna regardless of each user while the beamforming weight value is determined in the uplink channel information by each antenna and user, and because the downlink beamforming apparatus 220 obtains the beamforming weight value by each user so as to be applied by each antenna.

In addition, since search and control processes for the beamforming weight value of the subcarrier by each user are performed only in the section for multiplying the weight value for downlink beamforming, namely, the process for obtaining the beamforming weight value of the subcarrier by each user in the uplink is omitted, the control process for the beamforming weight value is simplified.

In addition, since the beam pattern is created in the downlink beamforming apparatus of the base station by using the beamforming weight value by each user, hardware complexity of the downlink beamforming apparatus is minimized by reducing the size of the buffer, and power consumption is also reduced.

The downlink beamforming apparatus according to the exemplary embodiment of the present invention can be applied to the design for the downlink transmitting apparatus of the OFDMA system because it is directly applied thereto during obtaining the beamforming weight value by each user at the front terminal of the downlink IFFT unit.

As those skilled in the art would realize, the described embodiments may be modified in various different manners, all without departing from the spirit or scope of the present invention. Accordingly, the foregoing drawings and description are to be regarded as illustrative in nature and not restrictive.

While this invention has been described in connection with what is presently considered to be preferred embodiments, it is to be understood that the invention is not limited thereto, but, on the contrary, is intended to cover various modifications and equivalent arrangements included within the spirit and scope of the appended claims.

What is claimed is:

1. A downlink beamforming apparatus of an orthogonal frequency division multiplex access system, the downlink beamforming apparatus comprising:
   a subcarrier based user identifier for dividing subcarriers according to users;
   a beamforming weight buffer for storing and outputting first beamforming weights for the subcarriers by each of a plurality of transmitting antennas;
   an interpolator for outputting second beamforming weights for each transmitting antenna by interpolating the first beamforming weights outputted by the beamforming weight buffer;
   a signal reproducer for making at least one copy of a signal to reproduce the signal for each transmitting antenna, wherein the subcarriers are allocated to the signal by each user; and
   a complex multiplier for multiplying the signal for each transmitting antenna reproduced by the signal reproducer by the second beamforming weights for each transmitting antenna outputted from the interpolator.

2. The downlink beamforming apparatus of claim 1, wherein a subcarrier based user identifier divides the subcarriers according to the users based on information used for allocating the subcarriers to a transmitting signal by each user.

3. The downlink beamforming apparatus of claim 1, wherein the beamforming weight buffer stores the first beamforming weights based on channel information obtained from a received uplink signal.

4. The downlink beamforming apparatus of claim 1, wherein the beamforming weight buffer outputs first beamforming weights corresponding to two subcarriers that are adjacent to a subcarrier of a user outputted from the subcarrier based user identifier, and the interpolator outputs at least one of the second beamforming weights for each transmitting antenna by interpolating the two first beamforming weights stored by the beamforming weight buffer.

5. The downlink beamforming apparatus of claim 1, wherein the interpolation is performed by a first Gaussian interpolation between two beamforming weight values outputted from the beamforming weight buffer.

6. The downlink beamforming apparatus of claim 1, wherein a size of the beamforming weight buffer is determined by the following Equation, $$K \times N_a \times 2 \times N_{used}$$

wherein K denotes a word length of uplink channel information, $N_a$ denotes a number of users, and $N_{used}$ denotes a number of subcarriers used in one symbol.

7. A downlink beamforming method of an orthogonal frequency division multiplex access system, the downlink transmitting method comprising:
   allocating subcarriers to a first transmitting signal by each user;
   storing first beamforming weights for the subcarriers by each of a plurality of transmitting antennas;
   identifying users to which the subcarriers are allocated,
   obtaining second beamforming weights for the allocated subcarriers from the first beamforming weights corresponding to the identified users; and
   multiplying the second beamforming weights by second transmitting signals for the transmitting antennas;
   comprising making at least one copy of the first transmitting signal to reproduce the second transmitting signals.

8. The downlink beamforming method of claim 7, wherein the second beamforming weights are obtained by each transmitting antenna after interpolating the first beamforming weights.

9. The downlink beamforming method of claim 7, wherein the obtaining the second beamforming weights further comprises:
   outputting first beamforming weights corresponding to at least two subcarriers that are adjacent to at least one subcarrier of at least one of the identified users; and
   interpolating at least one of the second beamforming weights for each transmitting antenna by interpolating the at least two first beamforming weights.

* * * * *